Oct. 23, 1923.
R. M. THOMPSON
HEADLIGHT OPERATING MECHANISM
Filed May 31, 1921
1,471,426
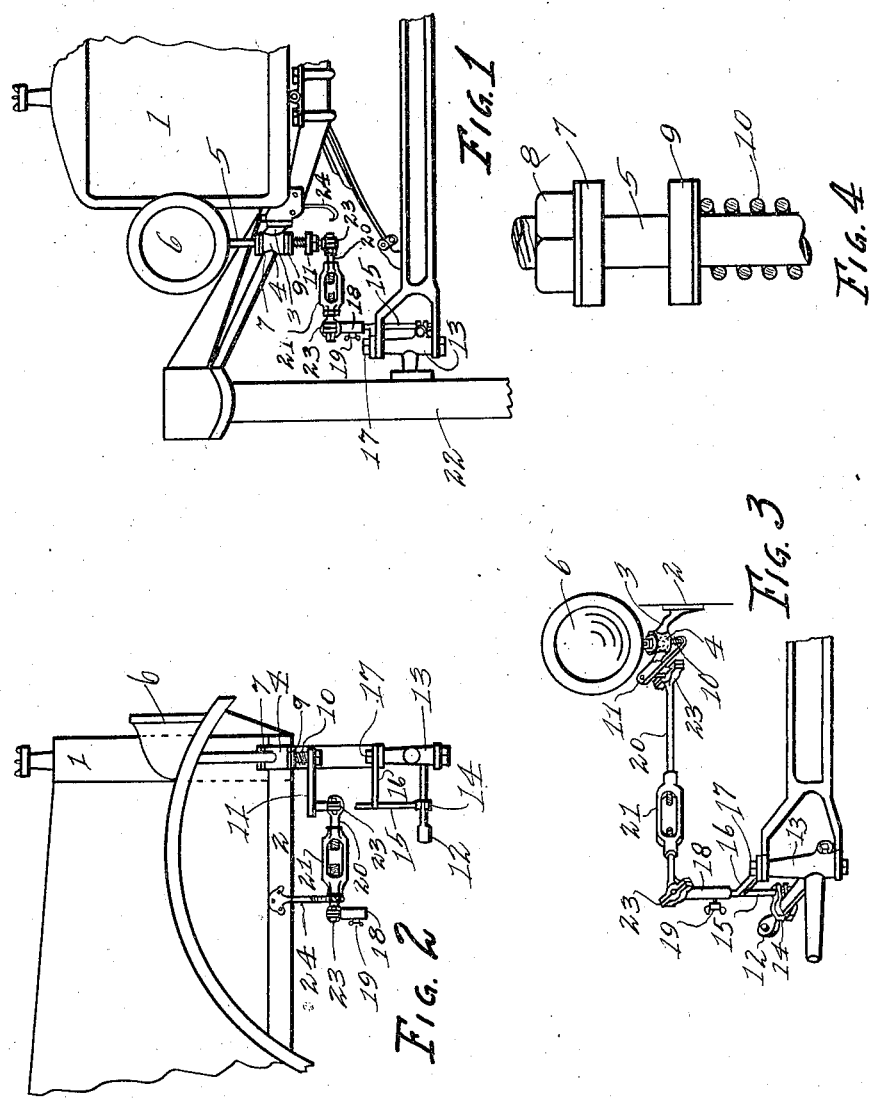
INVENTOR.
RILEY M. THOMPSON
BY
ATTORNEYS.

Patented Oct. 23, 1923.

1,471,426

UNITED STATES PATENT OFFICE.

RILEY M. THOMPSON, OF PENDLETON, OREGON.

HEADLIGHT-OPERATING MECHANISM.

Application filed May 31, 1921. Serial No. 473,755.

*To all whom it may concern:*

Be it known that I, RILEY M. THOMPSON, a citizen of the United States, residing at Pendleton, in the county of Umatilla and State of Oregon, have invented certain new and useful Improvements in Headlight-Operating Mechanism, of which the following is a specification.

This invention relates to means for operating headlights of automobiles and the like, to direct the rays of light issuing therefrom in the direction of travel.

One object of the invention is to provide an operating mechanism that may be readily attached to the moving parts of a vehicle.

A further object of the invention is to provide a means for the purpose mentioned that is flexible and yet positive in its action.

A further object of the invention is to provide a means that may be readily adjusted.

A further object of the invention is to provide a means that may be disconnected when not in use.

With these and other objects in view reference is now had to the accompanying drawings in which—

Fig. 1 is a front elevation of the device as applied to automobiles;

Fig. 2 is a side elevation thereof;

Fig. 3 is a perspective view of the device; and

Fig. 4 is a view in elevation of part of the headlight bearing stem and bearings.

Having reference to the drawings like numerals refer to like parts throughout and the numeral 1 refers to an automobile radiator which is mounted upon the frame 2.

Attached to the frame 2 is a bracket 3 having an enlarged portion 4 through which the headlight bearing stem 5 is passed in mounting the headlight 6.

The stem 5 rotates in the bracket during operation and to prevent rattle and to provide ease of movement is provided with a bearing means of novel construction which will now be explained.

On the stem and positioned above and below the bracket are thrust bearings of any suitable type. The upper bearing 7, see Fig. 4, carries the weight of the headlight and may be adjusted as to height by the nut 8 threadedly engaging the stem for the purpose.

The lower bearing 9 is yieldingly maintained in operable contact with the bracket by the spring 10 which is supported by the lever arm 11.

The lever arm 11 is rigidly attached to the stem 5 which is rotated thereby and is positioned horizontally and extended rearwardly from the stem to be engaged by the connecting rod to be explained.

Attached to the steering arm 12 of the spindle 13 is a clamp 14 of simple design and this clamp supports the post 15 which operates with the steering arm.

The post 15 is provided with a laterally extending stabilizing arm 16 which is movably attached to the spindle bolt, the nut 17 only of which being shown. The stabilizing arm is rigidly attached to the post and moves about the bolt and with the steering arm, and as its name implies, tends to stabilize and maintain the post in a vertical position in its path without lateral play.

The post is extended above the stabilizing arm to enter a sleeve 18 which is slidably mounted on the post. The sleeve is provided with a thumbscrew 19, or other suitable means, for fastening the sleeve on the post and is the means by which horizontal adjustment of the connecting rod, which will now be explained, is obtained.

Horizontally positioned, and joining the post and the lever arm is the connecting rod 20 consisting of two parts united by a turn buckle 21 whereby the position of the headlight with respect to the front wheel 22 is obtained. The rod is supplied on its ends with semi-universal joints 23 which unites with the post and lever arm respectively forming a flexible joint at these points.

A hook 24 is provided and is attached to the frame 2 wherewith to support the mechanism when disconnected, as shown in Fig. 2.

In use the headlight will obviously move with the wheel in the line of travel and hence the rays of light will always be ahead of the wheels.

With cars that are seldom out on night trips the mechanism may be disconnected as above mentioned, and when disconnected all wear and friction is eliminated.

Having thus described my invention, I claim:

In a headlight operating mechanism, in combination with the steering arm and spindle of an automobile, a headlight bearing stem provided with bearings, a bracket, a yielding means to maintain said bearings in operable contact with said bracket, a lever arm rigidly attached to said bearing stem and supporting said yielding means, a post provided with a clamp and a stabilizing arm and operable and connected with the steering arm and spindle bolt, a connecting rod flexibly and detachably connecting said post and said lever arm, and means slidably mounted on said post to adjust horizontally said connecting rod.

In testimony whereof I affix my signature.

RILEY M. THOMPSON.